United States Patent
Iizuka

(10) Patent No.: US 11,562,122 B2
(45) Date of Patent: Jan. 24, 2023

(54) INFORMATION PROCESSING APPARATUS, IMAGE PROCESSING APPARATUS, AND NON-TRANSITORY COMPUTER READABLE MEDIUM STORING PROGRAM

(71) Applicant: FUJIFILM Business Innovation Corp., Tokyo (JP)

(72) Inventor: Miyuki Iizuka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 12 days.

(21) Appl. No.: 17/017,686

(22) Filed: Sep. 11, 2020

(65) Prior Publication Data
US 2021/0279408 A1  Sep. 9, 2021

(30) Foreign Application Priority Data
Mar. 3, 2020  (JP) .............................. JP2020-035946

(51) Int. Cl.
*G06F 40/166*  (2020.01)
*H04N 1/04*  (2006.01)
(Continued)

(52) U.S. Cl.
CPC ............ *G06F 40/166* (2020.01); *G06V 30/40* (2022.01); *H04N 1/04* (2013.01); *G06V 10/40* (2022.01); *G06V 30/10* (2022.01)

(58) Field of Classification Search
CPC .... G06F 40/166; G06F 16/164; G06F 16/166; G06K 2209/01; G06K 9/00442;
(Continued)

(56) References Cited

U.S. PATENT DOCUMENTS 8,605,336 B2  12/2013 Inamoto et al.
9,104,683 B2 *  8/2015 Bubash ................. G06F 16/166
(Continued)

FOREIGN PATENT DOCUMENTS

EP  3079343 A1 * 10/2016 ........... G06F 16/164
JP  2005275849  10/2005
(Continued)

OTHER PUBLICATIONS

"Extracting data from PDF to create a filename", Aug. 21, 2019, UiPath Community Forum, pp. 11 (Year: 2019).*
(Continued)

*Primary Examiner* — Chau T Nguyen
(74) *Attorney, Agent, or Firm* — JCIPRNET

(57) ABSTRACT

An information processing apparatus includes a processor configured to extract, from a document, words of plural categories, select one extracted word from each of the plural categories, generate a first character string by arranging the selected words in accordance with a rule, wherein the rule determines positions of the selected words within the first character string based on the categories of the selected words, in response to reception of an operation of changing a first word in the first character string from a user, present to the user one or more candidate words from the category of the first portion of the first character string, generate a second character string by replacing the first word in the first character string with a user-selected word selected by the user from among the one or more candidate words, and store the second character string in a memory in association with the document.

20 Claims, 18 Drawing Sheets

(51) Int. Cl.
*G06V 30/40* (2022.01)
*G06V 10/40* (2022.01)
*G06V 30/10* (2022.01)

(58) Field of Classification Search
CPC ............ G06K 9/46; H04N 1/04; G06V 10/40; G06V 30/10; G06V 30/40
See application file for complete search history.

(56) References Cited

U.S. PATENT DOCUMENTS

| | | | |
|---|---|---|---|
| 9,307,109 B2 | 4/2016 | Inamoto et al. | |
| 9,641,715 B2 | 5/2017 | Shimazaki | |
| 2010/0215272 A1* | 8/2010 | Isaev | G06K 9/00469 |
| | | | 382/182 |
| 2013/0297308 A1* | 11/2013 | Koo | G06F 3/167 |
| | | | 704/235 |
| 2014/0049788 A1 | 2/2014 | Inamoto et al. | |
| 2014/0122479 A1* | 5/2014 | Panferov | G06K 9/00469 |
| | | | 707/736 |
| 2018/0218206 A1* | 8/2018 | Kamata | G06V 30/40 |
| 2019/0065451 A1* | 2/2019 | Miyamoto | G06F 40/166 |
| 2019/0065842 A1* | 2/2019 | Soga | G06V 30/416 |
| 2019/0065843 A1* | 2/2019 | Matsumoto | G06V 30/1456 |
| 2019/0089849 A1* | 3/2019 | Yamazaki | G06V 30/413 |
| 2019/0102385 A1* | 4/2019 | Tokita | G06F 16/164 |
| 2019/0197305 A1* | 6/2019 | Kanada | G06K 9/00442 |
| 2019/0228220 A1* | 7/2019 | Matsumoto | G06V 10/22 |
| 2019/0266397 A1* | 8/2019 | Arakawa | G06V 30/413 |
| 2020/0065294 A1* | 2/2020 | Takahashi | G06F 16/166 |

FOREIGN PATENT DOCUMENTS

| | | | | |
|---|---|---|---|---|
| JP | 2011076581 | | 4/2011 | |
| JP | 2016143165 | | 8/2016 | |
| WO | WO-2005024681 A1 * | | 3/2005 | ............ G06F 16/50 |

OTHER PUBLICATIONS

Kentaro Kaneda, "Image Processing Device and Storage Medium", published Jul. 2, 2019, CN 109961069A, pp. 12 (Year: 2019).*

* cited by examiner

| DOCUMENT NAME | DOCUMENT DATA |
|---|---|
| ESTIMATION SHEET_AA Company_06252019_102514.xdw | ... |
| CONTRACT_BB Company_08252019_091256.xdw | ... |
| ... | ... |

| USER ID | WORD ORDER RULE |
|---|---|
| U00 | <DOCUMENT TYPE>_<COMPANY NAME>_<DATE>_<TIME>.xdw |
| U01 | <DATE><TIME><DOCUMENT TYPE><COMPANY NAME>.xdw |
| U02 | [<DOCUMENT TYPE>]<COMPANY NAME>-<DATE>T<TIME>.xdw |
| ... | ... |

| USER ID | APPLICATION ORDER |
|---|---|
| U01 | R01→R02→R04 |
| U02 | R01→R03→R05 |
| U03 | R06, R07 |
| ... | ... |

| RATING ID | RATING INDEX |
|---|---|
| R01 | CLOSENESS TO BEGINNING OF DOCUMENT |
| R02 | FONT SIZE |
| R03 | WEIGHT OF CHARACTERS |
| R04 | FONT TYPE |
| R05 | COLOR INTENSITY OF CHARACTERS |
| R06 | ADJACENT WORD |
| R07 | SELECTION COUNT |
| ... | ... |

| USER ID | DATE OF SELECTION | WORD CATEGORY | SELECTED WORD | |
|---|---|---|---|---|
| ... | ... | ... | ... | ⟋223 |
| U01 | ... | DOCUMENT TYPE | ESTIMATION SHEET | |
| ... | ... | ... | ... | |

FIG. 11

| | AUTOMATICALLY SET DOCUMENT NAME (C1 ✓) |
| | APPLY GENERAL RULE (C2 ☐) |
| | APPLY USER'S RULE (C3 ✓) |

DOCUMENT NAME STRUCTURE (WORD ORDER RULE):

〈DOCUMENT TYPE〉_〈COMPANY NAME〉_〈DATE〉_〈TIME〉.xdw  (F1, P1)

PLEASE SELECT CATEGORIES OF WORDS TO BE INCLUDED IN DOCUMENT NAME. (T1)

| CHECK | CATEGORY | DESCRIPTION |
|---|---|---|
| ✓ | DOCUMENT TYPE | "ESTIMATION SHEET", "CONTRACT", ETC. |
| ✓ | COMPANY NAME | CHARACTER STRING RECOGNIZED AS COMPANY NAME |
| ☐ | REPRESENTATIVE PERSON | CHARACTER STRING RECOGNIZED AS NAME OF PERSON |
| ✓ | DATE | CHARACTER STRING RECOGNIZED AS DATE (OR TODAY'S DATE) |
| ... | ... | ... |

B1: OK

FIG. 24
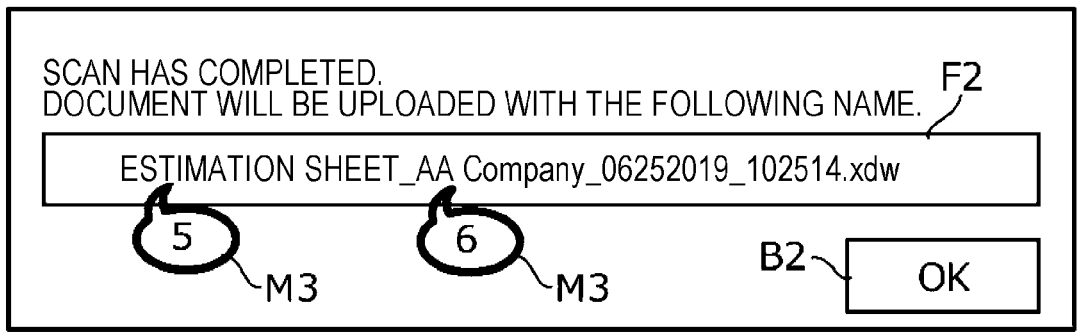
FIG. 25A
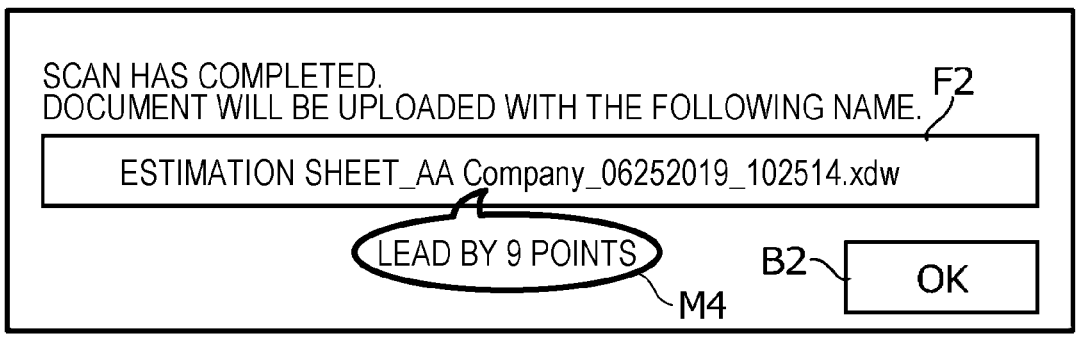
FIG. 25B

INFORMATION PROCESSING APPARATUS, IMAGE PROCESSING APPARATUS, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-035946 filed Mar. 3, 2020.

BACKGROUND

(i) Technical Field

The present disclosure relates to an information processing apparatus, an image processing apparatus, and a non-transitory computer readable medium storing a program.

(ii) Related Art

There is a technology in which a character string representing a document name, a tag, or a storage area name is assigned to a document based on contents of the document. For example, Japanese Unexamined Patent Application Publication No. 2011-76581 discloses an image processing apparatus that detects an entry position on a first sheet based on first image data obtained by reading the first sheet, recognizes characters in a region identified based on the detected entry position from second image data obtained by reading a second sheet, and generates an identification name of the second image data based on a result of the character recognition (claim 2).

For example, Japanese Unexamined Patent Application Publication No. 2005-275849 discloses a document processing apparatus that acquires image data, extracts and displays character strings by executing OCR in text portions of the image data, selects a character string to be included in a file name of the image data from among the displayed character strings, and sets the file name for the image data based on the selected character string.

SUMMARY

Aspects of non-limiting embodiments of the present disclosure relate to the following circumstances. In the technologies described above, there is a possibility that the assigned document name or the like is not appropriate. Therefore, a user may modify the document name or the like.

When a character string representing a document name or the like to be stored in association with a document is generated from words in the document, it is desirable that the character string be modified more easily than in a case where the user directly inputs characters for modification.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus comprising a processor configured to extract, from a document, words of a plurality of categories, select one extracted word from each of the plurality of categories, generate a first character string by arranging the selected words in accordance with a rule, wherein the rule determines positions of the selected words within the first character string based on the categories of the selected words, in response to reception of an operation of changing a first word in the first character string from a user, present to the user one or more candidate words from the category of the first portion of the first character string, generate a second character string by replacing the first word in the first character string with a user-selected word selected by the user from among the one or more candidate words, and store the second character string in a memory in association with the document.

BRIEF DESCRIPTION OF THE DRAWINGS

An exemplary embodiment of the present disclosure will be described in detail based on the following figures, wherein:

FIG. 6 illustrates an example of a word order RB;

FIG. 7 illustrates an example of a rating/application order RB;

FIG. 8 illustrates an example of a history DB;

FIG. 11 illustrates an example of an operation screen to be used for setting a word order rule;

FIG. 24 illustrates an example of a first character string presented together with additional information in the yet other modified example; and FIGS. 25A and 25B illustrate an example of a first character string presented together with additional information indicating a difference in ratings in yet another modified example.

DETAILED DESCRIPTION

Exemplary Embodiment

Configuration of Information Processing System

Figure 1:
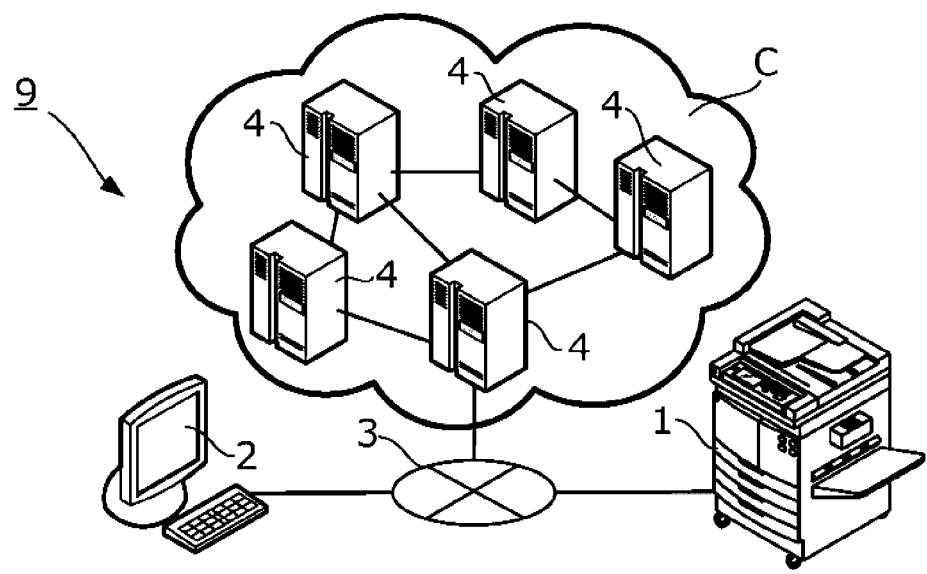
FIG. 1 illustrates an example of the overall configuration of an information processing system.

FIG. 1 illustrates an example of the overall configuration of an information processing system 9. In the information processing system 9, for example, the name of a created document is generated, changed in response to an instruction, and stored in association with the document. As illustrated in FIG. 1, the information processing system 9 includes an image processing apparatus 1, an information processing apparatus 2, a communication network 3, and servers 4.

The image processing apparatus 1 includes a scanner that optically reads a document image formed on a medium such as paper and generates document data. The image processing apparatus 1 supplies the document data to an external apparatus via the communication network 3. The image processing apparatus 1 may have a function of forming an image on a medium.

The information processing apparatus 2 is a terminal apparatus to be used by a user of the information processing system 9. Examples of the information processing apparatus 2 include a desktop personal computer (PC), a notebook PC, and a tablet PC. The information processing apparatus 2 receives a user's operation and sends instructions to the image processing apparatus 1 and the server 4 in response to the operation.

Examples of the server 4 include a computer. The server 4 responds to a request from the image processing apparatus 1 or the information processing apparatus 2 that is a client apparatus. In FIG. 1, the information processing system 9 includes a plurality of servers 4. The plurality of servers 4 dynamically share their functions to build a cloud C. In the cloud C, document data indicating a document read by the image processing apparatus 1 is stored with a unique document name. In the cloud C, any one of the plurality of servers 4 may function as a so-called load balancer that monitors processing loads of the other servers 4 and allocates processes.

The communication network 3 communicably connects the image processing apparatus 1, the information processing apparatus 2, and the servers 4. Examples of the communication network 3 include a local area network (LAN), a wide area network (WAN), the Internet, and combinations thereof. Examples of the communication network 3 also include public switched telephone networks (PSTNs) and an integrated services digital network (ISDN).

The numbers of image processing apparatuses 1, information processing apparatuses 2, communication networks 3, and servers 4 in the information processing system 9 are not limited to the numbers illustrated in FIG. 1 and may be one or plural.

Configuration of Image Processing Apparatus

Figure 2:
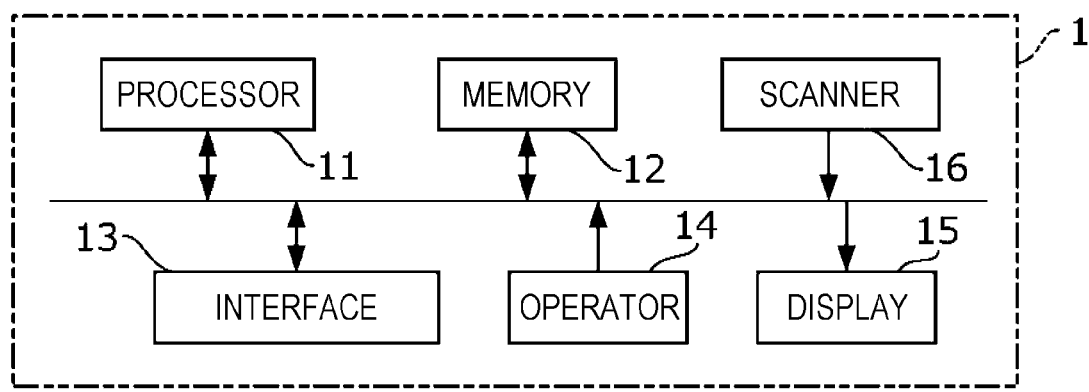
FIG. 2 illustrates an example of the configuration of an image processing apparatus.

FIG. 2 illustrates an example of the configuration of the image processing apparatus 1. In FIG. 2, the image processing apparatus 1 includes a processor 11, a memory 12, an interface 13, an operator 14, a display 15, and a scanner 16. For example, those components are communicably connected via a bus.

The processor 11 reads and executes computer programs (hereinafter referred to simply as "programs") stored in the memory 12 to control the individual parts of the image processing apparatus 1. Examples of the processor 11 include a central processing unit (CPU).

The memory 12 stores, for example, an operating system, various programs, and data to be read by the processor 11. The memory 12 includes a random access memory (RAM) and a read only memory (ROM). The memory 12 may include a solid-state drive or a hard disk drive.

The interface 13 is a communication circuit that communicably connects the image processing apparatus 1 to the information processing apparatus 2 and the server 4 via the communication network 3 by wire or wireless.

The operator 14 includes operation buttons, operation keys, or a touch panel for various instructions. The operator 14 receives an operation and sends a signal to the processor 11 in response to the operation.

The display 15 has a display screen such as a liquid crystal display and displays images under control of the processor 11. The display screen may be overlaid with a transparent touch panel of the operator 14.

Under control of the processor 11, the scanner 16 optically reads a document image formed on a medium such as paper and generates document data.

Configuration of Server

Figure 3:
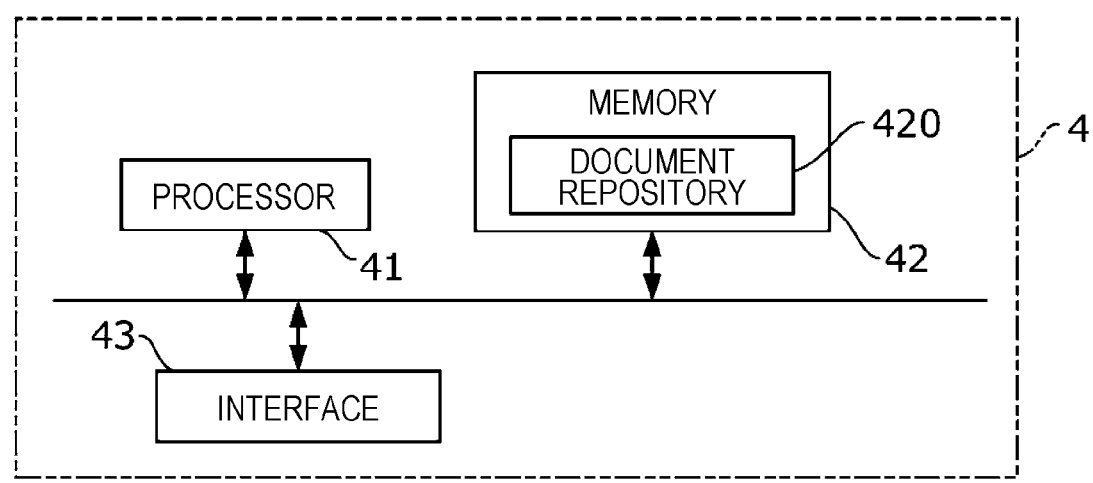
FIG. 3 illustrates an example of the configuration of a server.

FIG. 3 illustrates an example of the configuration of the server 4. In FIG. 3, the server 4 includes a processor 41, a memory 42, and an interface 43. For example, those components are communicably connected via a bus.

The processor 41 reads and executes programs stored in the memory 42 to control the individual parts of the server 4. Examples of the processor 41 include a CPU.

The interface 43 is a communication circuit that communicably connects the server 4 to the image processing apparatus 1 and the information processing apparatus 2 via the communication network 3 by wire or wireless.

The memory 42 stores, for example, an operating system, various programs, and data to be read by the processor 41. The memory 42 includes a RAM and a ROM. The memory 42 may include a solid-state drive or a hard disk drive.

Figures 4, 5:
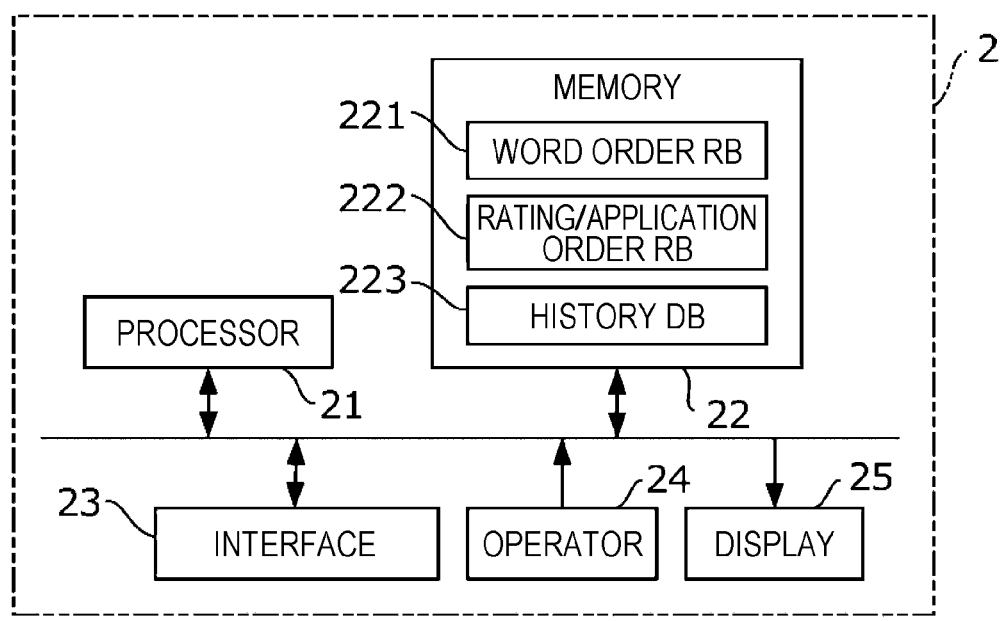
FIG. 4 illustrates an example of a document repository.
FIG. 5 illustrates an example of the configuration of an information processing apparatus.

The memory 42 stores a document repository 420. FIG. 4 illustrates an example of the document repository 420. As illustrated in FIG. 4, the document repository 420 is a storage area in which document data supplied by the image processing apparatus 1 is stored in association with a document name unique to a document indicated by the document data.

Configuration of Information Processing Apparatus

FIG. 5 illustrates an example of the configuration of the information processing apparatus 2. In FIG. 5, the information processing apparatus 2 includes a processor 21, a memory 22, an interface 23, an operator 24, and a display 25. For example, those components are communicably connected via a bus.

The processor 21 reads and executes programs stored in the memory 22 to control the individual parts of the information processing apparatus 2. Examples of the processor 21 include a CPU.

The interface 23 is a communication circuit that communicably connects the information processing apparatus 2 to the image processing apparatus 1 and the server 4 via the communication network 3 by wire or wireless.

The operator 24 includes operation buttons, a keyboard, a touch panel, or a mouse for various instructions. The operator 24 receives an operation and sends a signal to the processor 21 in response to the operation.

The display 25 has a display screen such as a liquid crystal display and displays images under control of the processor 21. The display screen may be overlaid with a transparent touch panel of the operator 24.

The memory 22 stores, for example, an operating system, various programs, and data to be read by the processor 21. The memory 22 includes a RAM and a ROM. The memory 22 may include a solid-state drive or a hard disk drive.

The memory 22 stores a word order RB 221, a rating/application order RB 222, and a history DB 223.

Configuration of Word Order RB

FIG. 6 illustrates an example of the word order RB 221. A character string representing a document name to be associated with a document (hereinafter referred to as "first character string") may be generated from a plurality of words in the document. The word order RB 221 is a rulebase that stores a rule that determines positions of the words in the first character string based on categories of the words (hereinafter referred to also as "word order rule"). In FIG. 6, the word order RB 221 stores word order rules for individual user IDs. The user ID is identification information of a user. A user ID "U00" is identification information that is not allocated to any user. A word order rule common to all users is stored in association with the user ID "U00".

In the word order RB 221 illustrated in FIG. 6, a word order rule associated with, for example, a user ID "U01" is "<DATE><TIME><DOCUMENT TYPE><COMPANY NAME>.xdw". This word order rule means that a user identified by "U01" stores document data in the server 4 in association with a first character string obtained by extracting words belonging to "date", "time", "document type", and "company name" from a document indicated by the document data, arranging the words in this order, and adding an extension ".xdw". In this word order rule, symbols "<" and ">" are reserved symbols representing a start point and an end point of the name of a word category.

Configuration of Rating/Application Order RB

FIG. 7 illustrates an example of the rating/application order RB 222. The rating/application order RB 222 is a rulebase that stores rating indices and the order of application of the rating indices. In response to reception of an operation of changing a word in a first character string (hereinafter referred to as "first word"), one or more candidate words from the category of the first word are displayed for a user. The rating index is used for determining the order of display of the candidate words. In FIG. 7, the rating/application order RB 222 includes an application order list 2221 and a rating index list 2222.

In the rating index list 2222, the rating indices are listed for individual rating IDs serving as identification information. For example, a rating ID "R01" is associated with a rating index "CLOSENESS TO BEGINNING OF DOCUMENT". This rating index means that a higher rating score is given to a word closer to the beginning of a document (e.g., "upper left corner").

For example, a rating ID "R02" is associated with a rating index "FONT SIZE". This rating index means that a higher rating score is given to a word having a larger font size.

For example, a rating ID "R04" is associated with a rating index "FONT TYPE". For example, this rating index means that points are preset for individual font types and candidate words are rated based on points of their font types.

For example, a rating ID "R06" is associated with a rating index "ADJACENT WORD". This rating index means that a candidate word is rated based on points preset for an adjacent word. In this rating index, for example, "10 points" are given to a candidate word adjacent to a word "Mr."

For example, a rating ID "R07" is associated with a rating index "SELECTION COUNT". This rating index means that a candidate word is rated based on frequencies of previous selections of the word by the user. In this rating index, the history DB 223 described later is referenced.

In the application order list 2221, the orders of application of the rating indices are listed for individual users. In FIG. 7, the application order list 2221 has fields for user IDs and application orders. For example, an application order "R01→R02→R04" is stored in association with the user ID "U01".

This application order means that one or more candidate words are rated in the order of "R01", "R02", and "R04" and are displayed in an order based on the rating in a case of the user "U01". That is, in the case of the user "U01", the order of display of candidate words from the category of the first word is determined by rating the candidate words first in terms of "CLOSENESS TO BEGINNING OF DOCUMENT", then in terms of "FONT SIZE", and lastly in terms of "FONT TYPE".

The fields for application orders may have an entry meaning that a plurality of rating indices are used together. For example, an entry "R06, R07" is stored for a user "U03" in FIG. 7. This entry means that candidate words are rated based on total rating scores of "ADJACENT WORD" and "SELECTION COUNT" for the user "U03".

Configuration of History DB

FIG. 8 illustrates an example of the history DB 223. The history DB 223 is a database that stores a word selected by a user from among presented candidate words to change a first word. In FIG. 8, the history DB 223 has fields for user IDs, dates of selection, word categories, and selected words.

In the history DB 223 illustrated in FIG. 8, the user ID is identification information of a user who selected a candidate word. The date of selection is information indicating a date when the user selected the candidate word to change a first word. The word category is information indicating the category of the first word changed by the user. The selected word is information indicating the candidate word selected by the user to change the first word and belonging to the category of the first word. The processor 21 references the history DB 223 to calculate frequencies of previous selections of the word in the document by the user.

Functional Configuration of Information Processing Apparatus

Figure 9:
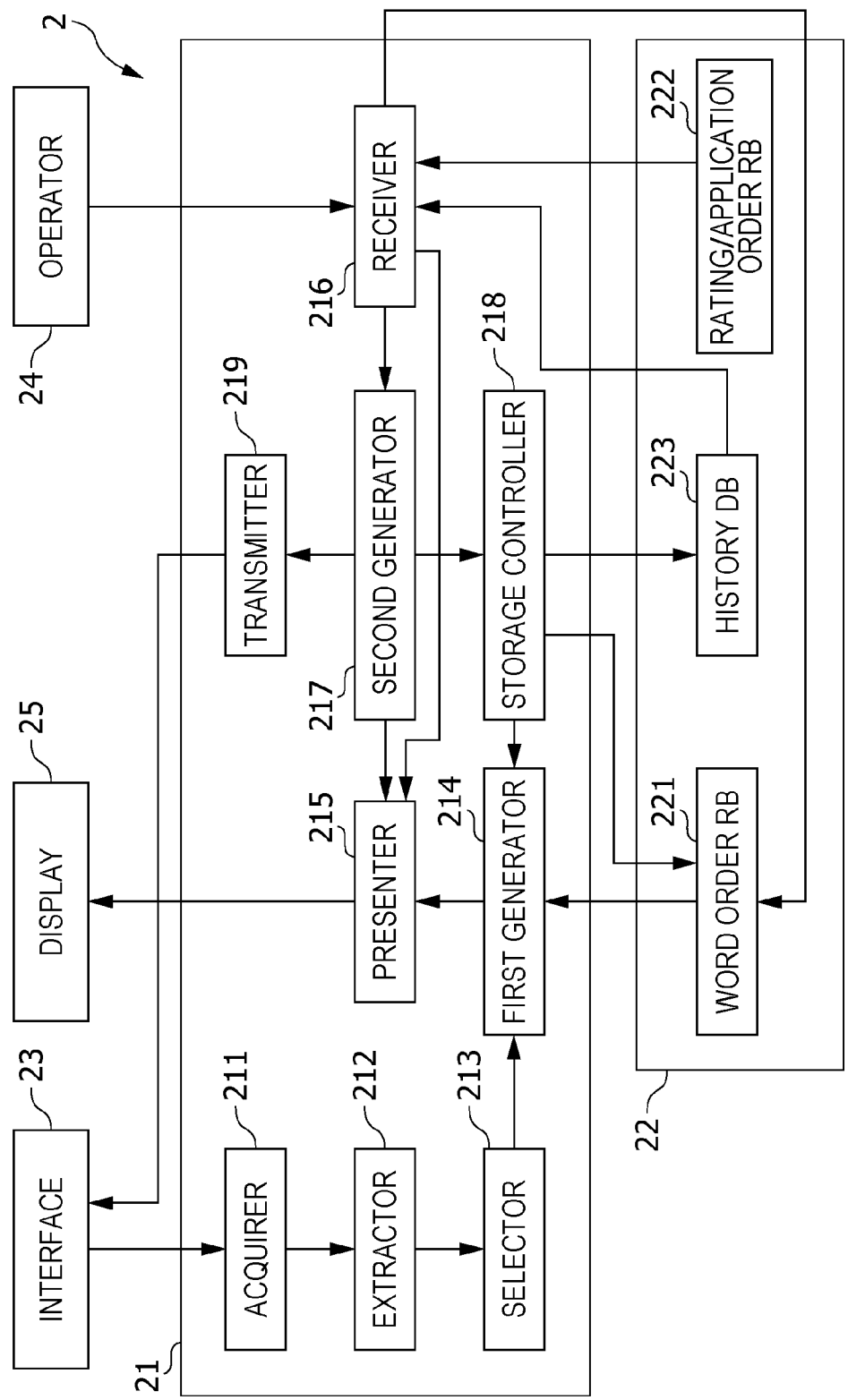
FIG. 9 illustrates an example of the functional configuration of the information processing apparatus.

FIG. 9 illustrates an example of the functional configuration of the information processing apparatus 2. The processor 21 of the information processing apparatus 2 executes the programs stored in the memory 22 to function as an acquirer 211, an extractor 212, a selector 213, a first generator 214, a presenter 215, a receiver 216, a second generator 217, a storage controller 218, and a transmitter 219.

The acquirer 211 acquires an image of a document read by the scanner 16 of the image processing apparatus 1. That is, the processor 21 that functions as the acquirer 211 is an example of a processor that acquires an image of a document read by a scanner.

The extractor 212 extracts words of a plurality of categories from the document shown in the acquired image. For example, the extractor 212 recognizes a plurality of words by executing optical character recognition (OCR) for the image acquired by the acquirer 211, and references a word database (not illustrated) stored in the memory 22 to identify categories of the recognized words. That is, the processor 21 that functions as the extractor 212 is an example of the processor that extracts words of a plurality of categories from the document.

The selector 213 selects one extracted word from each of the plurality of categories. For example, the selector 213 may select words in an order of appearance in the document, or based on application orders of ratings stored in the rating/application order RB 222. That is, the processor 21 that functions as the selector 213 is an example of the processor that selects one extracted word from each of the plurality of categories.

The first generator 214 generates a first character string by arranging the words selected by the selector 213 in accordance with a word order rule stored in the word order RB 221. That is, the processor 21 that functions as the first generator 214 is an example of the processor that generates a first character string by arranging the words selected by the selector 213 in accordance with a rule that determines positions of the words based on the categories.

In the word order RB 221, the word order rules need not be determined for the individual users, but the word order RB 221 illustrated in FIG. 6 stores the word order rules in association with the individual user IDs. When the first generator 214 arranges the words selected by the selector 213 based on, for example, the word order RB 221 illustrated in FIG. 6, different first character strings may be generated from the same document depending on the users. In this case, the processor 21 that functions as the first generator 214 is an example of the processor that generates a first character string in accordance with a user-specific rule.

The receiver 216 receives, from a user via the operator 24, an operation of changing a first word in the first character string or an operation of moving the position of the first word in the first character string to another position. Further, the receiver 216 receives an operation of changing the settings in the word order RB 221.

The presenter 215 presents to the user the first character string generated by the first generator 214 by displaying the first character string on the display 25.

In response to the receiver 216 receiving the operation of changing the first word in the first character string from the user, the presenter 215 presents to the user one or more candidate words in the document from the category of the first word, by displaying the candidate words on the display 25. That is, the processor 21 that functions as the presenter 215 is an example of the processor that, in response to reception of an operation of changing a first word in the first character string from the user, presents to the user one or more candidate words from the category of the first word.

When presenting a plurality of candidate words as the one or more candidate words in the category of the first word, the presenter 215 presents the plurality of candidate words in an order based on the rating/application order RB 222. That is, the processor 21 that functions as the presenter 215 is an example of the processor that, when presenting a plurality of candidate words as the one or more candidate words, presents the plurality of candidate words in an order in accordance with a predetermined criterion.

If the rating/application order RB 222 includes a rating index about a user's previous selection count, the presenter 215 may present the one or more candidate words in an order depending on results of rating of the candidate words based on the user's previous selection count with reference to the history DB 223. In this case, the processor 21 that functions as the presenter 215 is an example of the processor that, when presenting a plurality of candidate words as the one or more candidate words, presents the plurality of candidate words in an order determined by frequencies of previous selections of the plurality of candidate words by the user.

If the rating/application order RB 222 includes a rating index such as "CLOSENESS TO BEGINNING OF DOCUMENT", which means that words are rated based on positions in the document, the presenter 215 may present the one or more candidate words in an order depending on results of rating of the candidate words based on the positions in the document. In this case, the processor 21 that functions as the presenter 215 is an example of the processor that, when presenting a plurality of candidate words as the one or more candidate words, presents the plurality of candidate words in an order determined by locations of the plurality of candidate words within the document.

If the rating/application order RB 222 includes a rating index such as "ADJACENT WORD", which means that words are rated based on positions relative to a predetermined word in the document, such as "Mr.", "Dear", or "To", the presenter 215 may present the one or more candidate words in an order depending on results of rating of the candidate words based on the positions relative to the predetermined word in the document. In this case, the processor 21 that functions as the presenter 215 is an example of the processor that, when presenting a plurality of candidate words as the one or more candidate words, presents the plurality of candidate words in an order determined by relative locations to a predetermined word in the document.

If the rating/application order RB 222 includes a rating index meaning that words are rated based on distances from a predetermined graphical object in the document, such as a logotype of a company, the presenter 215 may present the one or more candidate words in an order depending on results of rating of the candidate words based on the distances from the graphical object. In this case, the processor 21 that functions as the presenter 215 is an example of the processor that, when presenting a plurality of candidate words as the one or more candidate words, presents the plurality of candidate words in an order determined by relative locations to a graphical object in the document.

If the rating/application order RB 222 includes a rating index meaning that words are rated based on, for example, dominance of each of the words in the document, the presenter 215 may present the one or more candidate words in an order determined based on results of rating of the candidate words based on the dominance. The "dominance of a word in a document" is, for example, the ratio of the area of the word to the overall area of the document. In this case, the processor 21 that functions as the presenter 215 is an example of the processor that, when presenting a plurality of candidate words as the one or more candidate words, presents the plurality of candidate words in an order determined based on dominance of each of the plurality of candidate words in the document.

The "overall area of the document" includes not only the areas of words but also the areas of graphical objects, illustrations, and pictures. The rating indices may include a rating index meaning that words are rated based on an area excluding the areas of graphical objects, illustrations, and pictures. That is, if the rating/application order RB 222 includes a rating index meaning that words are rated based on, for example, proportional frequencies of occurrences of the words in the document to all the words in the document, the presenter 215 may present the one or more candidate words in an order determined based on results of rating of the candidate words based on the proportional frequencies. In this case, the processor 21 that functions as the presenter 215 is an example of the processor that, when presenting a plurality of candidate words as the one or more candidate words, presents the plurality of candidate words in an order determined based on proportional frequencies of occurrences of the plurality of candidate words in the document to all the words in the document.

The receiver 216 receives, from the user via the operator 24, an operation of selecting a second word from among the candidate words presented by the presenter 215.

In response to the receiver 216 receiving the operation of selecting the second word, the second generator 217 generates a second character string by replacing the first word in the first character string with the selected second word. That is, the processor 21 that functions as the second generator 217 is an example of the processor that generates a second character string by replacing the first word in the first character string with a user-selected word selected by the user from among the presented candidate words.

The transmitter 219 transmits the generated second character string to the server 4 via the interface 23 in association with data indicating the document. The server 4 stores the received second character string in the document repository 420 of the memory 42 in association with the document data. That is, the processor 21 that functions as the transmitter 219 is an example of the processor that stores the second character string in the memory in association with the document.

The processor 41 of the server 4 that stores the second character string received from the information processing apparatus 2 in the document repository 420 of the memory 42 in association with the document data is an example of the processor that stores the second character string in the memory in association with the document.

The storage controller 218 stores, in the history DB 223, the word selected by the user to generate the second character string. In response to the receiver 216 receiving an operation of moving a position of the first word in the first character string to another position, the storage controller 218 moves the position of the first word to the another position within the first character string and updates the rule stored in the word order RB 221 to define that a word belonging to the category of the first word be positioned at a position corresponding to the another position.

That is, the processor 21 that functions as the storage controller 218 is an example of the processor that, in response to reception of an operation by the user to move the first word in the first character string to another position, moves the first word to the another position within the first character string and updates the rule to define that a word belonging to the category of the first word be positioned at a position corresponding to the another position. The first generator 214 generates a first character string including the first word moved in response to the operation. The presenter 215 displays the first character string on the display 25.

Operations of Information Processing Apparatus

Operation of Setting Word Order RB

Figure 10:
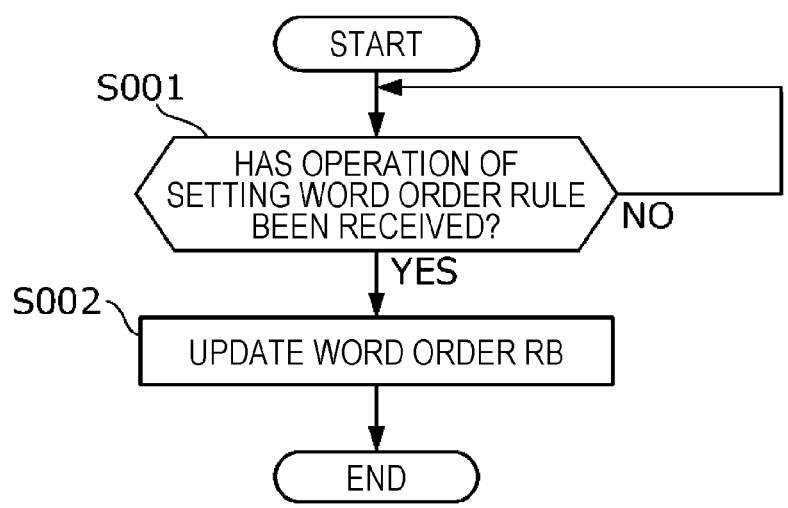
FIG. 10 is a flowchart illustrating an example of a flow of an operation of setting the word order RB.

FIG. 10 is a flowchart illustrating an example of a flow of an operation of setting the word order RB 221. The processor 21 of the information processing apparatus 2 determines whether an operation of setting a word order rule is received in the process of generating a document name (Step S001). If the processor 21 determines that the setting operation is not received (Step S001; NO), the processor 21 continues the determination of Step S001.

If the processor 21 determines that the setting operation is received (Step S001; YES), the processor 21 updates the word order RB 221 stored in the memory 22 in response to the operation (Step S002).

FIG. 11 illustrates an example of an operation screen to be used for setting the word order rule. In FIG. 11, a checkbox C1 is displayed at the left end of an option "AUTOMATICALLY SET DOCUMENT NAME." In response to the user marking the checkbox C1, the information processing apparatus 2 generates a first character string as a document name to be associated with a specified document.

In FIG. 11, a checkbox C2 is displayed at the left end of an option "APPLY GENERAL RULE." In FIG. 11, a checkbox C3 is displayed at the left end of an option "APPLY USER'S RULE." The checkbox C2 and the checkbox C3 in FIG. 11 are so-called radio buttons. The user selects one of the two radio buttons.

If the checkbox C2 is marked, the processor 21 generates a first character string by using a rule common to the users. For example, the processor 21 generates a first character string in accordance with the word order rule associated with the user ID "U00" in FIG. 6.

If the checkbox C3 is marked, the processor 21 generates a first character string by using a user-specific rule. For example, if the user who operates the information processing apparatus 2 has the user ID "U01", the processor 21 generates a first character string in accordance with the word order rule associated with the user ID "U01" in FIG. 6.

In FIG. 11, an input field F1 is a field where the user inputs the structure of a document name, that is, a character string representing a word order rule. In FIG. 11, a table T1 shows a list of categories of words to be included in a document name, and a list of descriptions of the individual categories. In response to the user marking any checkbox in the table T1, a category associated with the marked checkbox is added to the input field F1.

For example, the user marks checkboxes associated with "DOCUMENT TYPE", "COMPANY NAME", and "DATE" as illustrated in FIG. 11. Then, character strings representing the categories enclosed with reserved symbols "<" and ">" are added to the input field F1. That is, character strings "<DOCUMENT TYPE>", "<COMPANY NAME>", and "<DATE>" are added to the input field F1.

For example, the user edits the input field F1 by adding an underscore "_" as a spacing between words, and pushes an "OK" button B1. Then, the processor 21 updates the word order RB 221 by using the character string input to the input field F1 as a word order rule of the user.

The input field F1 may receive an operation of changing the order of words in a word order rule from the user.

Figure 12:
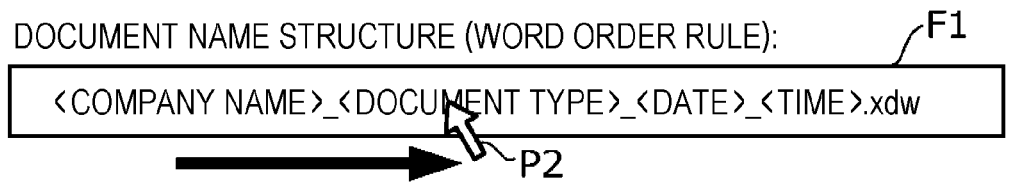
FIG. 12 illustrates an example of an operation of changing the order of words.

FIG. 12 illustrates an example of the operation of changing the order of words. For example, a user moves a mouse pointer to a point P1 in FIG. 11, pushes a mouse button, moves the mouse pointer to a point P2 in FIG. 12 while pushing the mouse button, and releases the mouse button. At this time, the processor 21 switches the character string "<DOCUMENT TYPE>" displayed at the point P1 with the character string "<COMPANY NAME>" displayed at the point P2 in the input field F1 that is being edited. As a result, the character string "<DOCUMENT TYPE>_<COMPANY NAME>_<DATE>_<TIME>.xdw" in the input field F1 of FIG. 11 is changed to a character string "<COMPANY NAME>_<DOCUMENT TYPE>_<DATE>_<TIME>.xdw" in the input field F1 of FIG. 12.

Operation of Presenting First Character String

Figure 13:
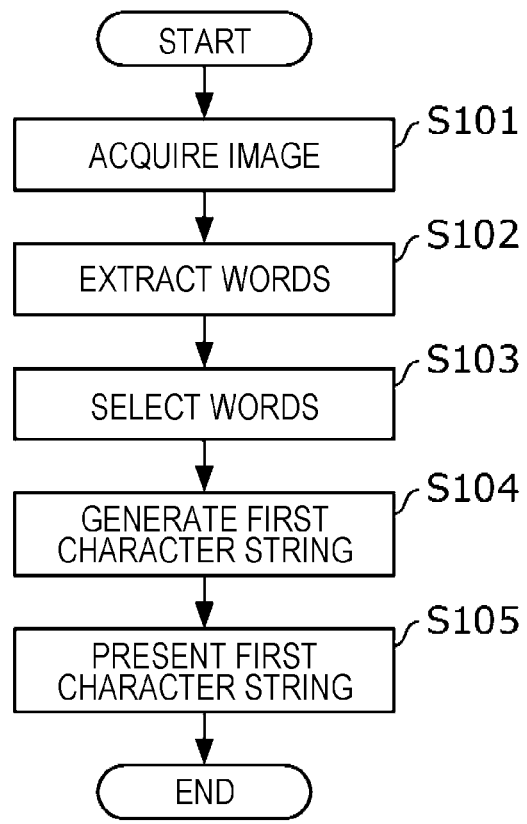
FIG. 13 is a flowchart illustrating an example of a flow of an operation of presenting a first character string.

FIG. 13 is a flowchart illustrating an example of a flow of an operation of presenting a first character string. The processor 21 of the information processing apparatus 2 acquires data indicating an image read by the scanner 16 from the image processing apparatus 1 (Step S101) and then extracts words from a document shown in the image from the image data (Step S102). At this time, the processor 21 recognizes words from the image by optical character recognition, and references the database prestored in the memory 22 to sort the words based on their categories.

Next, the processor 21 selects one extracted word from each of the categories to generate a first character string based on, for example, an application order of rating stored in the rating/application order RB 222 (Step S103).

The processor 21 generates a first character string by arranging the selected words in accordance with a word order rule set for a user with reference to the word order RB 221 (Step S104), and presents to the user the generated first character string by displaying the first character string on the display 25 (Step S105).

Figure 14:
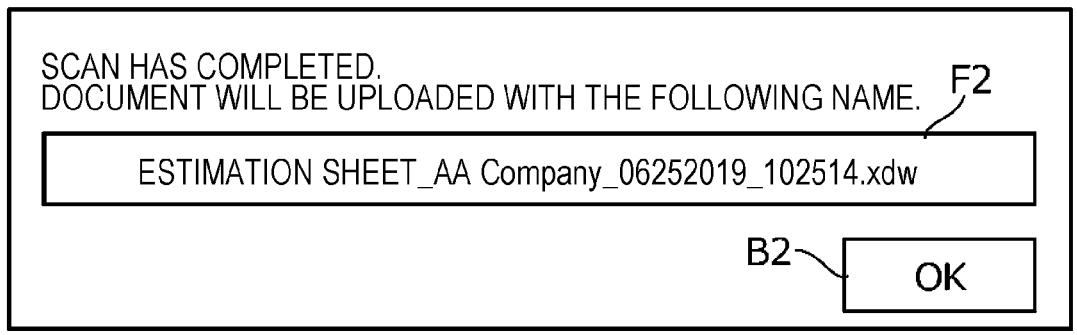
FIG. 14 illustrates an example of the presented first character string.

FIG. 14 illustrates an example of the presented first character string. In FIG. 14, a generated first character string "ESTIMATION SHEET_AA Company_06252019_102514.xdw" is shown in an input field F2.

Operation of Storing Document

Figure 15:
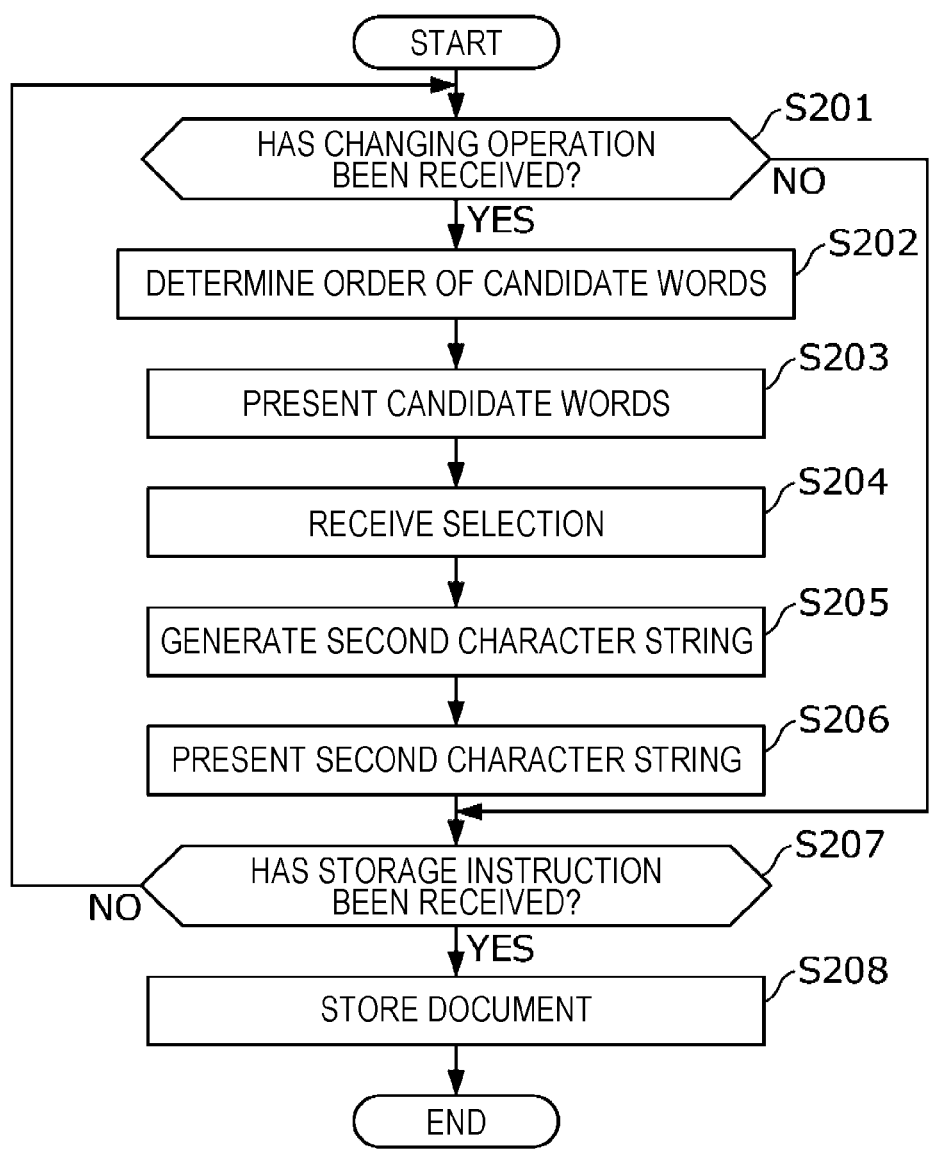
FIG. 15 is a flowchart illustrating an example of a flow of an operation of storing a document.

FIG. 15 is a flowchart illustrating an example of a flow of an operation of storing a document. The processor 21 of the information processing apparatus 2 determines whether an operation of changing a first word in a first character string is received from a user (Step S201). If the processor 21 determines that the operation is not received (Step S201; NO), the processor 21 advances the process to Step S207.

If the processor 21 determines that the operation of changing the first word in the first character string is received (Step S201; YES), the processor 21 determines the order of one or more candidate words from the category of the first word (Step S202).

FIGS. 16A to 16D illustrate an example of the operation of changing the first word. When the user moves a mouse pointer to a point P3 and pushes a mouse button in the input field F2 illustrated in FIG. 16A, the processor 21 interprets this operation and changes what is displayed on the display 25. For example, the processor 21 interprets the operation and causes the display 25 to display a first word "AA Company" at the point P3 in boldface type in the first character string shown in the input field F2.

Next, the processor 21 identifies the category of the first word "AA Company". The category of this first word is "company name". The processor 21 identifies candidate words belonging to "company name" among the words extracted from the document. For example, the processor 21 identifies candidate words "BB Company" and "DD Company" from the category of the first word "AA Company".

The processor 21 rates the identified candidate words with reference to the rating/application order RB 222. For example, if the user ID is "U01", the processor 21 references the rating/application order RB 222 illustrated in FIG. 7 to rate the candidate words in terms of "CLOSENESS TO BEGINNING OF DOCUMENT" identified by the rating ID "R01". If the candidate words have the same rating score, the processor 21 rates the candidate words in terms of "FONT SIZE" identified by the rating ID "R02". If the candidate words still have the same rating score, the processor 21 rates the candidate words in terms of "FONT TYPE" identified by the rating ID "R04".

If "BB Company" gains a higher score than "DD Company" through the rating described above, the processor 21 determines the order of the candidate words as "BB Company→DD Company".

Next, the processor 21 presents the one or more candidate words in the determined order (Step S203).

Figure 16A:
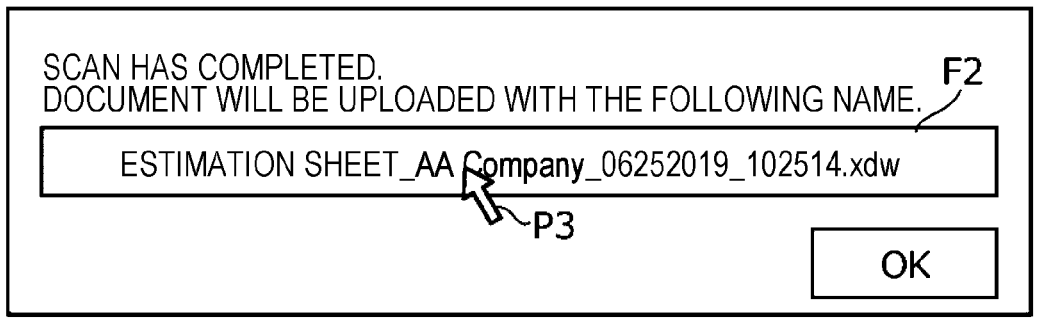
FIGS. 16A to 16D illustrate an example of an operation of changing first words.
Figure 16B:
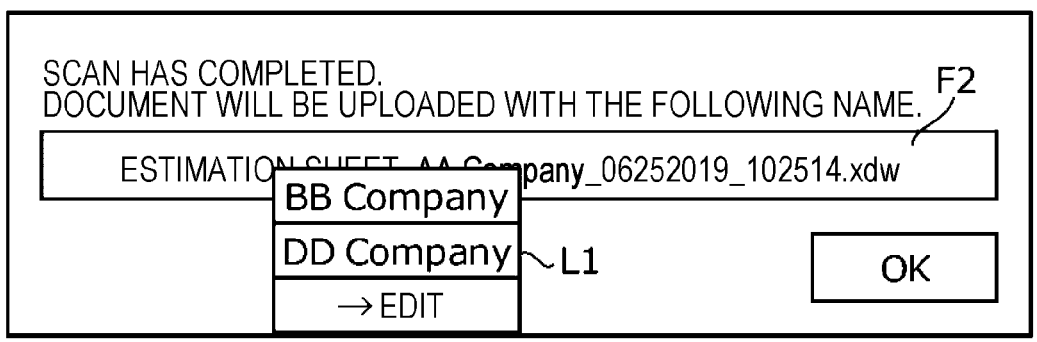

For example, as illustrated in FIG. 16B, the processor 21 causes the display 25 to lay a pull-down list L1 on "AA Company". The pull-down list L1 is a list of the candidate words arranged in the determined order "BB Company→DD Company".

Next, the processor 21 receives a user's operation for selecting any candidate word from among the one or more presented candidate words (Step S204). The processor 21 generates a second character string by replacing the first word with the selected second word (Step S205), and presents to the user the generated second character string by displaying the second character string on the display 25 (Step S206).

In the example illustrated in FIG. 16B, the user selects a second word from among the candidate words in the pull-down list L1. Then, the processor 21 replaces the first word with the selected second word. Thus, a second character string is generated. For example, the user knows that a word at a higher place in the pull-down list L1 has a higher rating score. Therefore, the user selects the second word while grasping its rating.

The pull-down list L1 also includes an option "→EDIT" at the bottom. In response to clicking of the option "→EDIT", the processor 21 receives a user's operation for editing the first word "AA Company" in the input field F2 by using a keyboard or the like.

Figure 16C:
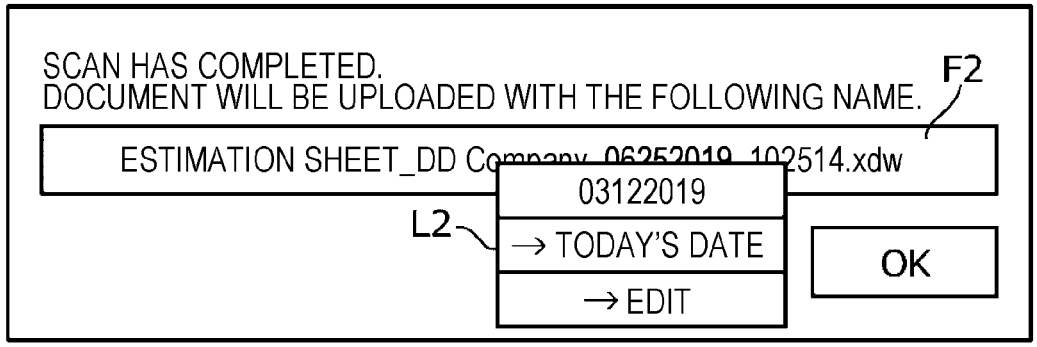

As illustrated in FIG. 16C, the user selects a first word "06252019" in the first character string. Then, the processor 21 displays the first word "06252019" in boldface type on the display 25. The processor 21 identifies the category of the first word as "date" and identifies candidate words belonging to "date" among the words in the document.

For example, the processor 21 identifies a candidate word "03122019" from the category of the first word "06252019". The processor 21 causes the display 25 to lay a pull-down list L2 including "03122019" on "06252019". In response to the user selecting a second word from among the candidate words in the pull-down list L2, the processor 21 replaces the first word with the selected second word. Thus, a second character string is generated.

The pull-down list L2 includes an option "→EDIT" and an option "→TODAY'S DATE". In response to clicking of the option "→TODAY'S DATE", the processor 21 replaces the first word "06252019" in the input field F2 with a word meaning the today's date.

Next, the processor 21 determines whether a document storage instruction is received from the user (Step S207). If the processor 21 determines that the document storage instruction is not received (Step S207; NO), the processor 21 returns the process to Step S201. If the processor 21 determines that the document storage instruction is received (Step S207; YES) and if the first character string is not changed, the processor 21 instructs the server 4 to store the first character string in association with the document (Step S208). If the processor 21 determines that the document storage instruction is received (Step S207; YES) and if the first character string is changed, the processor 21 instructs the server 4 to store the second character string in association with the document (Step S208).

Figure 16D:
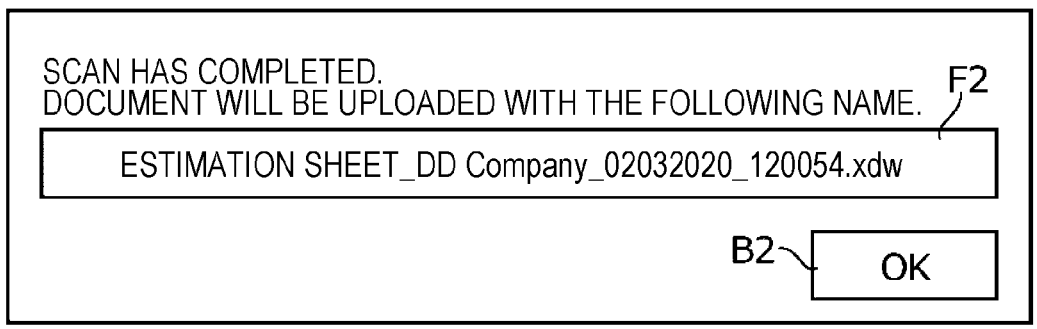

After the operation of selecting the first words and replacing the first words with the second words, the user pushes, for example, an "OK" button B2 illustrated in FIG. 16D. Then, the processor 21 instructs the server 4 to store the character string in the input field F2 as the name of the document specified by the user.

The information processing apparatus 2 may receive, from the user, not only the operation of replacing a first word with a second word but also an operation of changing positions of first words in a first character string.

Figure 17:
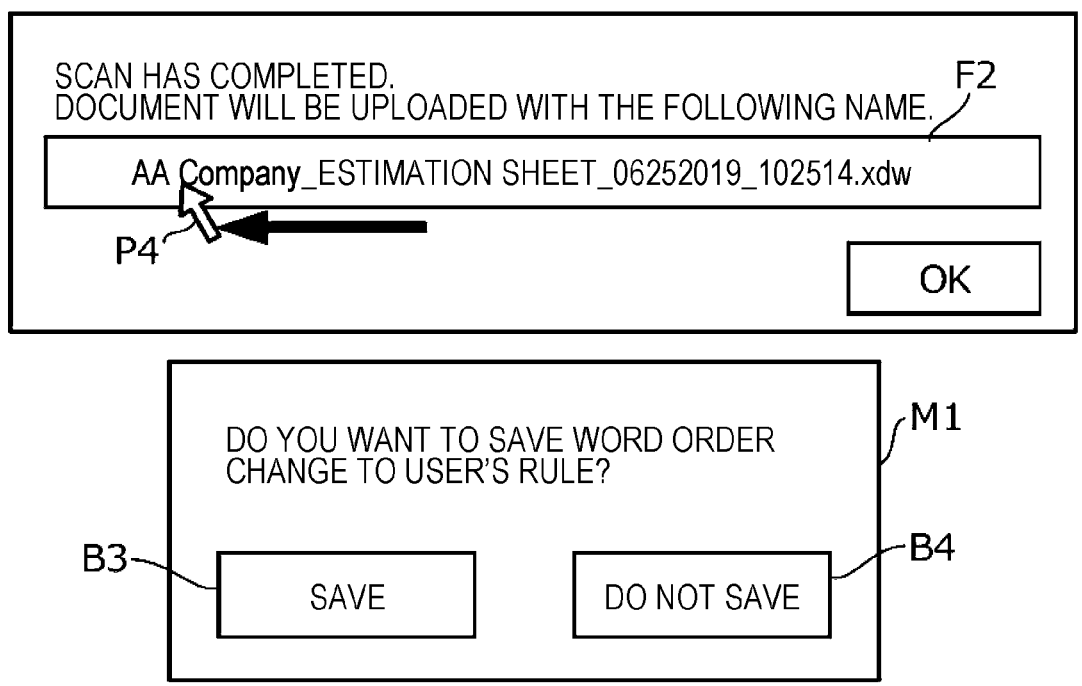
FIG. 17 illustrates an example of an operation of changing positions of first words in the first character string.

FIG. 17 illustrates an example of the operation of changing positions of first words in a first character string. For example, a user moves a mouse pointer to the point P3 in FIG. 16A, pushes a mouse button, moves the mouse pointer to a point P4 in FIG. 17 while pushing the mouse button, and releases the mouse button. At this time, the processor 21 switches the character string "AA Company" displayed at the point P3 with the character string "ESTIMATION SHEET" displayed at the point P4 in the input field F2 that is being edited. The processor 21 is an example of the processor that moves the first word in the first character string to another position in response to reception of an operation by the user to move the first word to the another position.

At this time, the information processing apparatus 2 may prompt the user to confirm whether to reflect the operation of moving the first word to another position on the user's word order rule in the word order RB 221. For example, a message M1 for the user in FIG. 17 reads "DO YOU WANT TO SAVE WORD ORDER CHANGE TO USER'S RULE?" If the user pushes a "DO NOT SAVE" button B4, the processor 21 makes no change to the word order RB 221.

If the user pushes a "SAVE" button B3, the processor 21 reflects the operation on the user's word order rule in the word order RB 221. Thus, the user's word order rule in the word order RB 221 is changed based on the character string in the input field F2. That is, the processor 21 is an example of the processor that, in response to reception of the operation by the user to move the first word in the first character string to another position, moves the first word to the another position within the first character string and updates the rule to define that a word belonging to the category of the first word be positioned at a position corresponding to the another position.

The processor 21 displays the message M1 and changes the order of words in the rule in response to the instruction to reflect the movement of the first word to the rule. That is, the processor 21 is an example of the processor that changes the position of the category of the first word in the rule in response to the reception of the operation by the user to move the first word in the first character string to another position and in response to an instruction from the user to reflect the movement of the first word to the rule.

Through the operations described above, the information processing system 9 extracts words from a document to be stored and arranges the words to generate a document name or the like to be associated with the document. At this time, the information processing system 9 presents to a user candidates to modify the document name or the like for each word category.

MODIFIED EXAMPLES

<1>

In the exemplary embodiment described above, the information processing system 9 serves as a so-called client-server system, in which the image processing apparatus 1 or the information processing apparatus 2 is connected to the server to extract words from a document, generate a character string from the extracted words, and store the character string in association with the document. However, a single apparatus may perform those operations. For example, the image processing apparatus 1 may implement the functions of the information processing apparatus 2 and the server 4.

<2>

In the exemplary embodiment described above, the information processing apparatus 2 includes the processor 21 that is the CPU. The information processing apparatus 2 may be controlled by a controller other than the CPU. For example, the information processing apparatus 2 may have various processors other than the CPU. Various processors may also be employed as the controllers for the image processing apparatus 1 and the server 4.

The term "processor" refers to hardware in a broad sense. Examples of the processor include general processors (e.g., CPU), and dedicated processors (e.g., GPU: Graphics Processing Unit, ASIC: Application Integrated Circuit, FPGA: Field Programmable Gate Array, and programmable logic device).

<3>

In the embodiment above, the term "processor" is broad enough to encompass one processor or plural processors in collaboration which are located physically apart from each other but may work cooperatively.

The order of operations of the processor is not limited to one described in the embodiment above, and may be changed.

Figure 18:
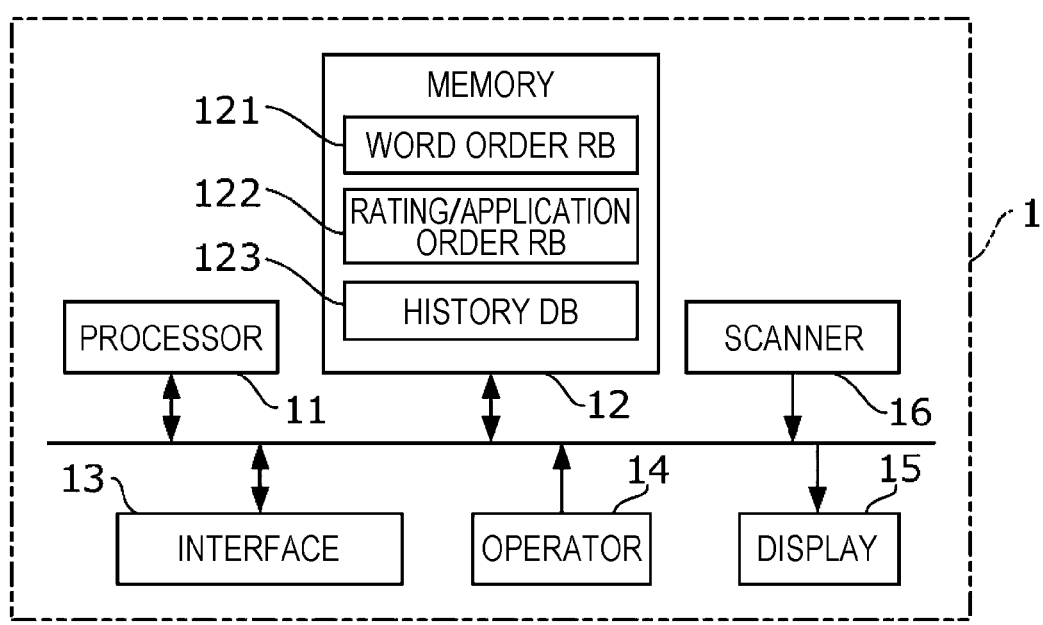
FIG. 18 illustrates an example of the configuration of an image processing apparatus in a modified example.

For example, the processor 11 of the image processing apparatus 1 may have at least a subset of the functions of the processor 21. FIG. 18 illustrates an example of the configuration of the image processing apparatus 1 in a modified example. In FIG. 18, the memory 12 of the image processing apparatus 1 stores a word order RB 121, a rating/application order RB 122, and a history DB 123. Those components are similar to the word order RB 221, the rating/application order RB 222, and the history DB 223 stored in the memory 22 of the information processing apparatus 2 in the exemplary embodiment described above.

Figure 19:
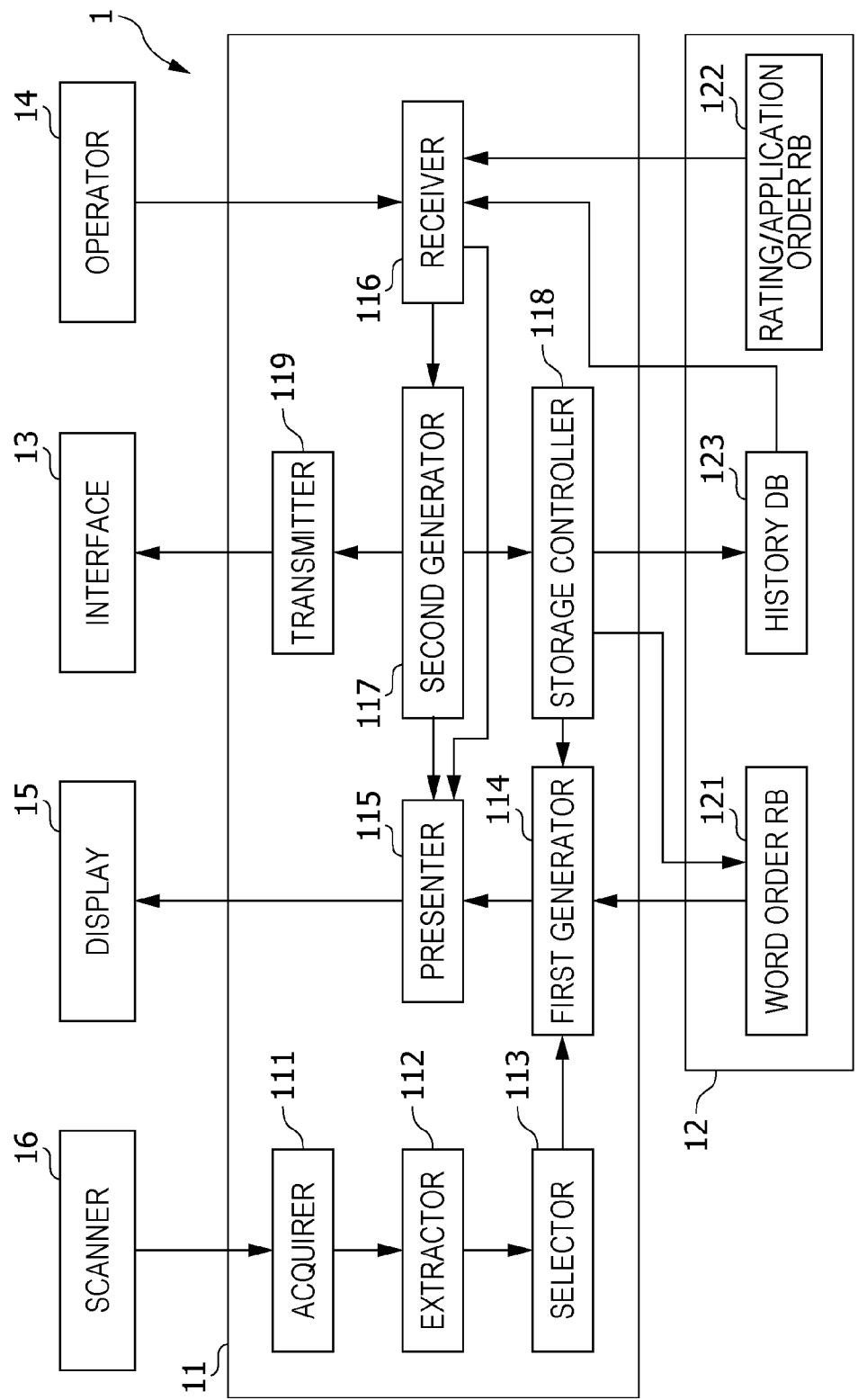
FIG. 19 illustrates an example of the functional configuration of the image processing apparatus in the modified example.

FIG. 19 illustrates an example of the functional configuration of the image processing apparatus 1 in the modified example. The processor 11 of the image processing apparatus 1 executes programs stored in the memory 12 to function as an acquirer 111, an extractor 112, a selector 113, a first generator 114, a presenter 115, a receiver 116, a second generator 117, a storage controller 118, and a transmitter 119. Those components are similar to the acquirer 211, the extractor 212, the selector 213, the first generator 214, the presenter 215, the receiver 216, the second generator 217, the storage controller 218, and the transmitter 219 except that the acquirer 111 directly acquires a document image from the scanner 16.

As illustrated in FIG. 19, the functions of the processor 21 of the information processing apparatus 2 may be implemented by the processor 11 of the image processing apparatus 1. In this case, the image processing apparatus 1 is a client apparatus that requests the server 4 to store a document in response to reception of a user's operation.

<4>

Figure 20:
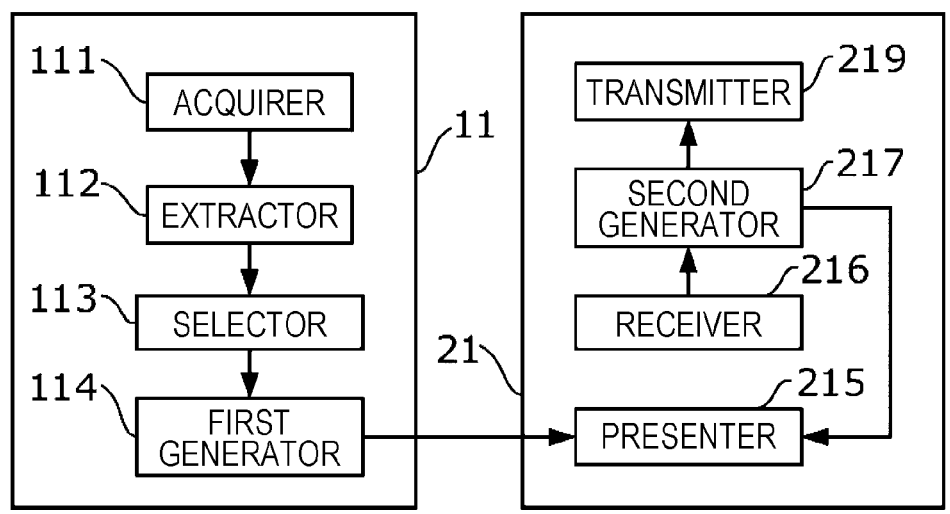
FIG. 20 illustrates functions of a first processor and a second processor in another modified example.

The processor 11 may have a subset of the functions of the processor 21 in the exemplary embodiment described above, and the processor 21 may have the remaining functions. FIG. 20 illustrates functions of the processor 11 and the processor 21 in another modified example. In FIG. 20, the components other than the processor 11 of the image processing apparatus 1 and the components other than the processor 21 of the information processing apparatus 2 are omitted.

In FIG. 20, the processor 11 of the image processing apparatus 1 functions as the acquirer 111, the extractor 112, the selector 113, and the first generator 114. In FIG. 20, the processor 21 of the information processing apparatus 2 functions as the presenter 215, the receiver 216, the second generator 217, and the transmitter 219. In this case, the information processing apparatus 2 acquires a first character string generated by the image processing apparatus 1, presents to the user the first character string, generates a second character string in response to reception of an operation of changing a first word in the first character string, and transmits a document to the server 4.

<5>

Figure 21:
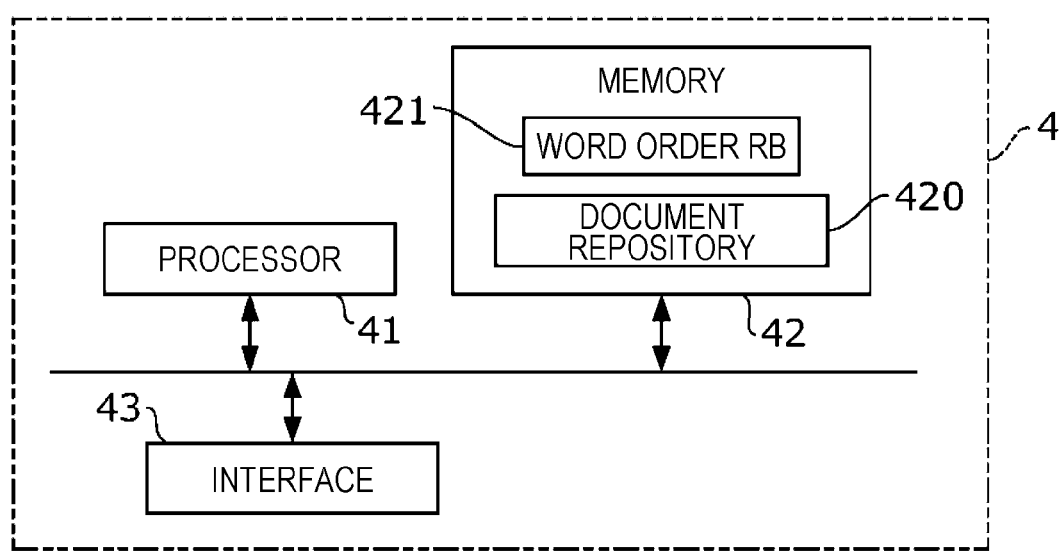
FIG. 21 illustrates the configuration of a server in still another modified example.

The processor 41 of the server 4 may have a subset of the functions of the processor 21 in the exemplary embodiment described above, and the processor 21 may have the remaining functions. FIG. 21 illustrates the configuration of the server 4 in still another modified example. The memory 42 of the server 4 stores a word order RB 421 in addition to the document repository 420. The word order RB 421 is similar to the word order RB 221 stored in the memory 22 of the information processing apparatus 2 in the exemplary embodiment described above.

Figure 22:
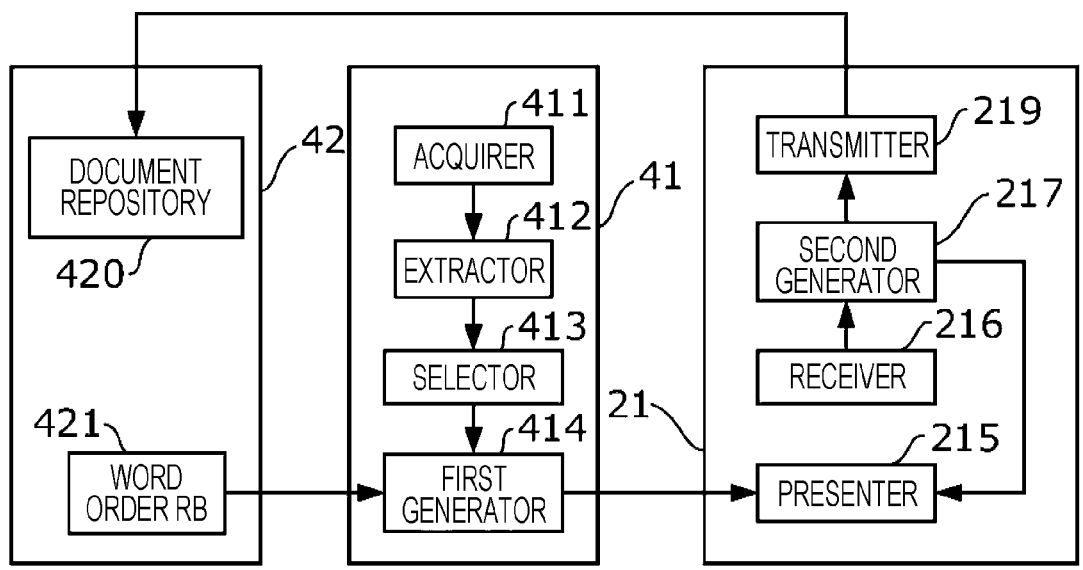
FIG. 22 illustrates functions of a first processor and a second processor in the still other modified example.

FIG. 22 illustrates functions of the processor 41 and the processor 21 in the still other modified example. In FIG. 22, the components other than the processor 41 and the memory 42 of the server 4 and the components other than the processor 21 of the information processing apparatus 2 are omitted.

In FIG. 22, the processor 41 of the server 4 functions as an acquirer 411, an extractor 412, a selector 413, and a first generator 414. The acquirer 411 acquires an image of a document read by the scanner 16 of the image processing apparatus 1. The extractor 412 extracts words of a plurality of categories from the document shown in the acquired image. The selector 413 selects one extracted word from each of the plurality of categories. The first generator 414 generates a first character string by arranging the words selected by the selector 413 in accordance with a word order rule stored in the word order RB 421.

In FIG. 22, the processor 21 of the information processing apparatus 2 functions as the presenter 215, the receiver 216, the second generator 217, and the transmitter 219. In this case, the information processing apparatus 2 acquires the first character string generated by the server 4, presents to the user the first character string, generates a second character string in response to reception of an operation of changing a first word in the first character string, and transmits the document to the server 4. The server 4 stores the second character string generated by the information processing apparatus 2 in the document repository 420 in association with the transmitted document.

<6>

Figure 23:
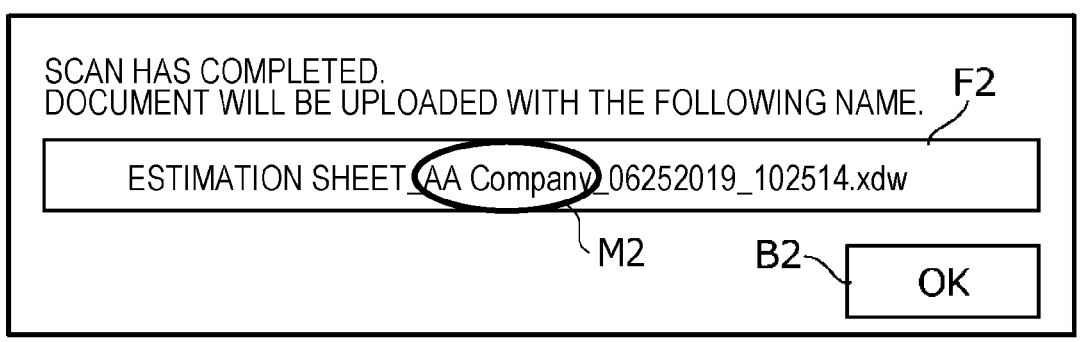
FIG. 23 illustrates an example of a presented first character string in yet another modified example.

In the exemplary embodiment described above, the processor 21 presents to the user a generated first character string in the same format, but may present to the user the first character string in different formats depending on words in the first character string. FIG. 23 illustrates an example of a presented first character string in yet another modified example.

The processor 21 determines whether the category of any word in the first character string satisfies a predetermined condition. If the processor 21 determines that the condition is satisfied, the processor 21 presents the word in the first character string that belongs to the category satisfying the condition in a second format that is different from the first format in which the rest of the first character string is presented.

In FIG. 23, an oval M2 is laid on "AA Company" to enclose "AA Company" in the first character string "ESTIMATION SHEET_AA Company_06252019_102514.xdw" in the input field F2. The processor 21 determines that the category "company name" of "AA Company" satisfies the predetermined condition. Therefore, the processor 21 encloses "AA Company" with the oval M2 as a format different from the format in which the rest of the first character string is presented. In this case, the processor 21 is an example of the processor that presents, if a category of any word in the first character string satisfies a predetermined condition, the word in the first character string in a second format that is different from the first format in which the rest of the first character string is presented.

For example, the condition to be satisfied by the category of any word in the first character string may be a condition that the number of other words in the document that belong to the category is equal to or larger than a predetermined number. In this case, the user finds the word presented in the second format that is different from the first format in which the rest of the first character string is presented. The user grasps that the number of candidate words in the document that belong to the category of the presented word is equal to or larger than the predetermined number.

<7>

In the modified example described above, the processor 21 may present the word belonging to the category satisfying the predetermined condition together with additional information related to the word. FIG. 24 illustrates an example of a first character string presented together with additional information in the modified example.

In FIG. 24, a number "5" is shown as additional information M3 in a balloon placed at "ESTIMATION SHEET" and a number "6" is shown as additional information M3 in a balloon placed at "AA Company" in the first character string "ESTIMATION SHEET_AA Company_06252019_102514.xdw" in the input field F2. Those numbers mean that the document includes five candidate words belonging to the category "document type" of "ESTIMATION SHEET", and six candidate words belonging to the category "company name" of "AA Company". The user viewing the additional information M3 presented together with the first character string grasps the number of candidate words as a substitute for the word having the additional information M3. The processor 21 is an example of the processor that presents, if the category of any word in the first character string satisfies the predetermined condition, the first character string together with information related to the word satisfying the predetermined condition.

If the number of candidate words in the category of a word in the first character string is, for example, equal to or larger than a threshold "5", the processor 21 presents the word in the first character string in a second format that is different from a first format of a word having less than "5" candidate words. Thus, the user grasps that the number of candidate words as a substitute for the word having no additional information M3 is smaller than the threshold. That is, the processor 21 is an example of the processor that presents, if the number of other words belonging to the category of the word in the first character string is equal to or larger than a threshold, the first character string together with information related to the word satisfying the predetermined condition.

<8>

The condition may be a different condition. Examples of the predetermined condition include a condition that a difference between a rating of any word in the first character string and a second rating of another word in the document belonging to the category of the word in the first character string is smaller than a threshold. FIGS. 25A and 25B illustrate an example of a first character string presented together with additional information indicating the difference in ratings in yet another modified example.

In FIG. 25A, a message "LEAD BY 9 POINTS" is shown as additional information M4 in a balloon placed at "AA Company" in the first character string in the input field F2. The message means that "AA Company" leads, by 9 points in rating, a candidate word belonging to the category "company name" of "AA Company".

In response to the user pushing a mouse button on "AA Company", the processor 21 displays a pull-down list L3 of FIG. 25B on the display 25. The pull-down list L3 is a list of rating scores of words in the document that belong to the category "company name" of "AA Company". As illustrated in FIG. 25B, "AA Company" has the highest rating score of "40 points", and "BB Company" has the second highest rating score of "31 points". The user viewing the additional information M4 illustrated in FIG. 25A grasps the word in the first character string that is rated above the word having the second highest score with a difference smaller than the threshold.

<9>

The program to be executed by the processor 11 of the image processing apparatus 1 is an example of a program causing a computer having a processor to execute a process comprising extracting, from a document, words of a plurality of categories, selecting one extracted word from each of the plurality of categories, generating a first character string by arranging the selected words in accordance with a rule, wherein the rule determines positions of the selected words within the first character string based on the categories of the selected words, in response to reception of an operation of changing a first word in the first character string from a user, presenting to the user one or more candidate words from the category of the first portion of the first character string, generating a second character string by replacing the first word in the first character string with a user-selected word selected by the user from among the one or more candidate words, and storing the second character string in a memory in association with the document.

The program may be provided by being stored in a computer readable recording medium such as a magnetic recording medium typified by a magnetic tape and a magnetic disk, an optical recording medium typified by an optical disc, a magneto-optical recording medium, or a semiconductor memory. Further, the program may be downloaded via a communication network such as the Internet.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in an order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising
a processor configured to
extract, from a document, words of a plurality of categories,
select one extracted word from each of the plurality of categories,
generate a first character string by arranging the selected words in accordance with a rule, wherein the rule determines positions of the selected words within the first character string based on the categories of the selected words,
in response to reception of an operation being performed on a first word among the selected words in the first character string from a user, present to the user one or more candidate words that belong to a category of the first word in the first character string,
in response to reception of another operation being performed on a user-selected word selected from among the one or more candidate words, generate a second character string by replacing the first word in the first character string with the user-selected word, and
store the second character string in a memory in association with the document.

2. The information processing apparatus according to claim 1, wherein the processor is configured to
when presenting a plurality of candidate words as the one or more candidate words, present the plurality of candidate words in an order in accordance with a predetermined criterion.

3. The information processing apparatus according to claim 2, wherein the order is determined by frequencies of previous selections of each of the plurality of candidate words by the user.

4. The information processing apparatus according to claim 3, wherein the order is determined by locations of the plurality of candidate words within the document.

5. The information processing apparatus according to claim 4, wherein the locations are relative locations to a predetermined word in the document.

6. The information processing apparatus according to claim 2, wherein the order is determined by locations of the plurality of candidate words within the document.

7. The information processing apparatus according to claim 6, wherein the locations are relative locations to a predetermined word in the document.

8. The information processing apparatus according to claim 6, wherein the locations are relative locations to a graphical object in the document.

9. The information processing apparatus according to claim 2, wherein the order is based on dominance of each of the plurality of candidate words in the document.

10. The information processing apparatus according to claim 9, wherein the order is based on proportional frequencies of occurrences of the plurality of candidate words in the document to all words in the document.

11. The information processing apparatus according to claim 1, wherein the processor is configured to
in response to reception of an operation by the user to move the first word in the first character string to another position:
move the first word to the another position within the first string, and
update the rule to define that a word belonging to the category of the first word be positioned at a position corresponding to the another position.

12. The information processing apparatus according to claim 11, wherein the processor is configured to
in response to the reception of an operation by the user to move the first word in the first character string to another position and reception of an instruction from the user to reflect a movement of the first word to the rule, update the rule to define that a word belonging to the category of the first word be positioned at a position corresponding to the another position.

13. The information processing apparatus according to claim 1, wherein the rule is user-specific.

14. The information processing apparatus according to claim 1, wherein the processor is configured to
in response to any word in the first character string satisfying a predetermined condition, present the word satisfying the predetermined condition in a second format that is different from a first format in which a rest of the first character string is presented.

15. The information processing apparatus according to claim 14, wherein the predetermined condition is the number of other words belonging to the category of the word in the first string being equal to or larger than a threshold.

16. The information processing apparatus according to claim 14, wherein the predetermined condition is a difference between a rating of the word in the first character string and a second rating of another word belonging to the category of the word being smaller than a threshold, wherein the first rating and the second rating is based on a predetermined criterion.

17. The information processing apparatus according to claim 1, wherein the processor is configured to
in response to a category of any word in the first character string satisfying a predetermined condition, present the first character string together with information related to the word satisfying the predetermined condition.

18. The information processing apparatus according to claim 1, wherein the processor is further configured to
in response to reception of an operation being performed on a second word among the selected words in the first character string from the user, present to the user one or more other candidate words that belong to another category of the second word in the first character string, wherein the second word is different from the first word.

19. An image processing apparatus comprising:
a scanner; and
a processor configured to
acquire an image of a document read by the scanner,
extract, from the document shown in the image, words of a plurality of categories,
select one extracted word from each of the plurality of categories,
generate a first character string by arranging the selected words in accordance with a rule, wherein the rule determines positions of the selected words within the first character string based on the categories of the selected words,
in response to reception of an operation being performed on a first word among the selected words in the first character string from a user, present to the user one or more candidate words that belong to a category of the first word in the first character string,
in response to reception of another operation being performed on a user-selected word selected from among the one or more candidate words, generate a second character string by replacing the first word in the first character string with the user-selected word, and
store the second character string in a memory in association with the document.

20. A non-transitory computer readable medium storing a program causing a computer having a processor to execute a process comprising:
extracting, from a document, words of a plurality of categories;
selecting one extracted word from each of the plurality of categories;
generating a first character string by arranging the selected words in accordance with a rule, wherein the rule determines positions of the selected words within the first character string based on the categories of the selected words;
in response to reception of an operation being performed on a first word among the selected words in the first character string from a user, presenting to the user one or more candidate words that belong to a category of the first word in the first character string;
in response to reception of another operation being performed on a user-selected word selected from among the one or more candidate words, generating a second character string by replacing the first word in the first character string with the user-selected word; and
storing the second character string in a memory in association with the document.

* * * * *